April 15, 1969  B. BELISLE  3,438,551

DISPENSER COMBINATION FOR LIQUIDS

Filed May 17, 1967

INVENTOR.
BRICE BELISLE
BY Friedman & Goodman
ATTORNEYS

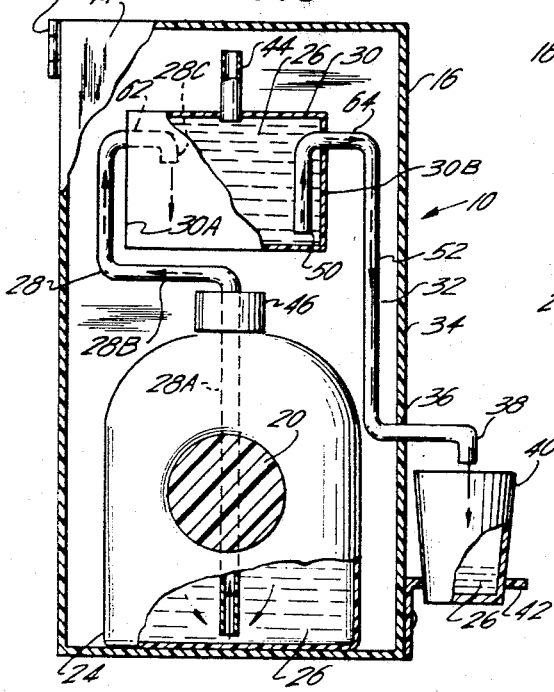
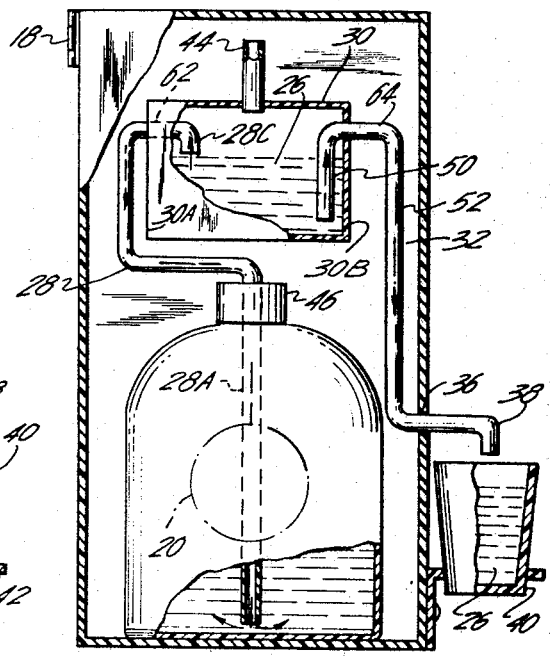

3,438,551
DISPENSER COMBINATION FOR LIQUIDS
Brice Belisle, 315 E. 5th St., New York, N.Y. 10003
Filed May 17, 1967, Ser. No. 639,118
Int. Cl. B67d 5/54, 5/30
U.S. Cl. 222—182          13 Claims

ABSTRACT OF THE DISCLOSURE

This is concerned with providing a novel dispenser combination for dispensing liquids such as alcoholic beverages. Briefly, the invention contemplates placing a polyethylene reservoir bottle inside a suitable case therefor, said reservoir bottle being provided with a smaller reservoir connected thereto, and said smaller reservoir being connected to means for delivering the liquid in measured amount to a glass outside the case. Actuating means for activating the dispensing operation are provided accessible outside of the case.

BACKGROUND OF THE INVENTION

Field of the invention

This invention relates generally to a dispenser for liquids. More particularly, the invention relates to a dispenser combination for dispensing measured amounts of liquids, such as alcoholic beverages, or the like.

Description of the prior art

Adapters, for measuring desired amounts, on liquor bottles are known. For example, the adapter is placed inside the neck of the bottle and when the bottle is tilted to pour out the liquid, the desired amount only, usually an ounce or ounce and a quarter, comes out into the glass.

Plunger activated dispensers provided on hand lotion bottles are also known. Generally the plunger and tube connected thereto are placed inside the neck of the bottle with the plunger exposed, and when the plunger is pushed downwardly hand lotion pours forth from a spigot also located outside the neck of the bottle.

Also known is the use of polyethylene "squeeze" bottles for holding lotions or shampoo, or the like, which is squirted out of the bottle by merely squeezing it.

It is a serious disadvantage of the latter two prior art dispensers that the liquid pours forth in unmeasured amounts resulting in uneconomical wastage. While the aforementioned liquor bottle adapters do pour out measured amounts, this is a disadvantage in that the entire bottle must be picked up and poured resulting in wasted energy and the danger of dropping the heavy bottle out of the hand of the pourer.

Summary of the invention

It is, therefore, among one of the principal objectives of this invention to provide a novel dispenser combination for dispensing measured amounts of liquids without disturbing the location of the bottle.

In accordance with the present invention a dispenser combination for dispensing measured amounts of liquid, such as alcoholic beverages, has been devised which comprises a squeeze bottle of polyethylene or the like comprising a reservoir holding the store of liquid, said squeeze bottle being placed inside a suitable case therefor with additional reservoir means for holding a measured amount of the liquid being connected to said squeeze bottle, said additional reservoir being further connected to means for delivering the liquid in measured amount to a glass therefor disposed outside of the said case, said liquid being dispensed by the action of actuating means provided for said polyethylene squeeze bottle.

Brief description of the drawing

The invention will be hereinafter more fully described with reference to the accompanying drawing, in which:

FIGURE 5 is a view similar to FIGURE 3, except that the liquid is shown being dispensed into the glass provided therefor;

FIGURE 6 is a view similar to FIGURE 5 with the glass shown as full and the actuating means for dispensing being in the released condition;

FIGURE 7 is a front view, partially cut away, of another specific embodiment of the invention; and FIGURE 8 is a side elevational, cross-sectional view, of the embodiment partially shown by FIGURE 7.

Description of the preferred embodiments

Figure 1:
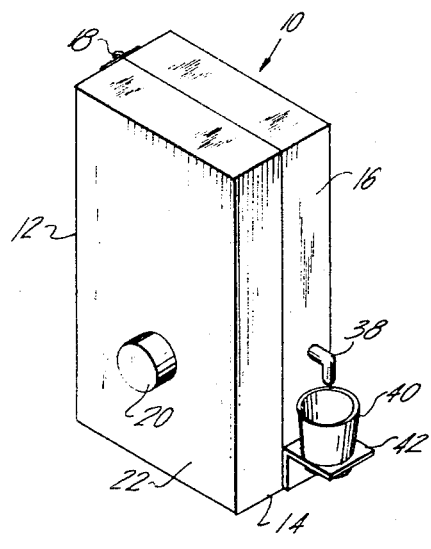
FIGURE 1 is a perspective view of the novel liquid dispenser combination, with the case holding the dispensing mechanism in the detachably engaged condition.
Figure 2:
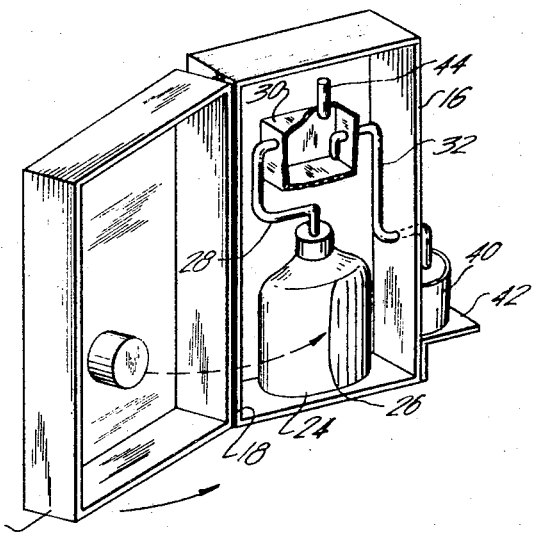
FIGURE 2 is another perspective view showing the cover of the case hingingly swung out from the rear portion, and further showing the dispensing mechanism inside the case partially cut away.

Referring now to the figures of the drawing, the dispensing device is generally referred to by the numeral 10. It comprises a generally rectangular shaped case 12, divided into a front cover portion 14 and a rear portion 16, said front cover 14 being pivotally engaged to rear portion 16 by means of hinges 18. An actuating member 20 is provided in an opening for the same provided on the face portion 22 of said front cover and extends partially into the case. In the rear half portion 16 is located a squeeze bottle 24 of polyethylene or the like which acts as a reservoir for the liquid 26 to be dispensed. Connected thereto by means of a tube 28 is a smaller reservoir 30 generally rectangular shaped, whose function will be subsequently described. Another tube 32 leads from the reservoir 30 out the side wall 34 by means of a bore 36 provided in the same, said tube 32 emerging from said side wall 34 in a horizontal fashion and being bent at a right angle to the horizontal at its end 38 so that it will point directly into a glass 40 provided therefor. The glass 40 rests in a holder 42 secured to side wall 34 at its lowermost end, by means of rivets 41. An air vent 44 communicates to the outside atmosphere from the top of said reservoir 30. The tube 28 has a vertical portion 28A which extends down into the liquid 26 in the bottle almost to the bottom thereof, and emerges from the top 46 of the bottle wherein it veers left at right angle thereto extending for a portion 28B just below the reservoir 30 and then veering at a right angle upwardly adjacent the vertical side 30A of the reservoir until a point about ⅔ of the way from the top of the reservoir 30 wherein said tube 28 again veers inwardly at a right angle entering the reservoir side 30A by means of a bore (not shown) and finally terminating downwardly at its end 28C at another right angle partially into the liquid 26. With regard to tube 32, the upper portion thereof comprises a segment 50 which extends down into the liquid 26 almost to the bottom but not quite touching, thereafter segment 50 emerges from the liquid and forms a U shape with the longer vertical portion 52 of tube 32 finally emerging through bore 36 of wall 34 at a right angle as described above.

The operation of the invention combination will best be shown by referring to FIGURES 3-6, inclusive.

Figure 3:
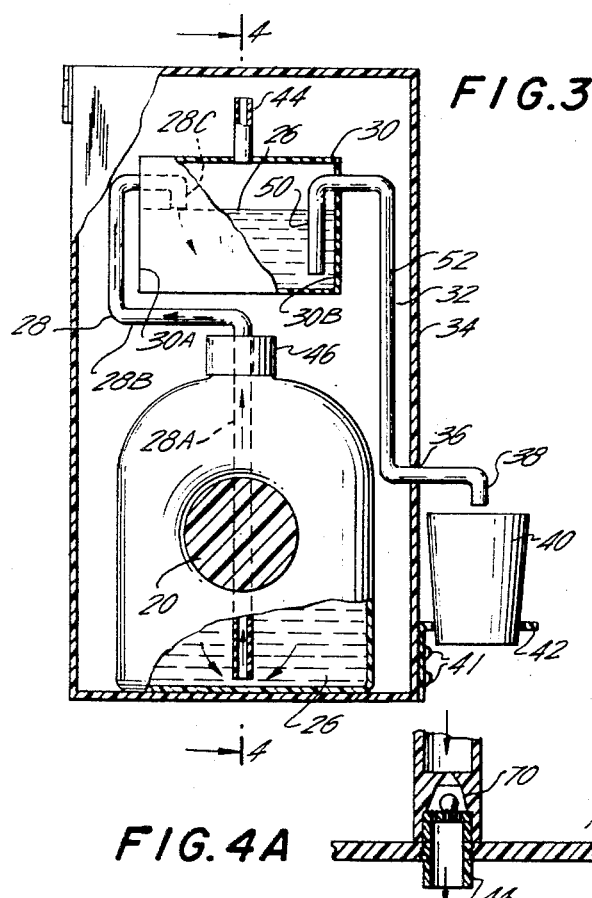
FIGURE 3 is a front view of the case in cross-section and partially cut away.
Figure 4:
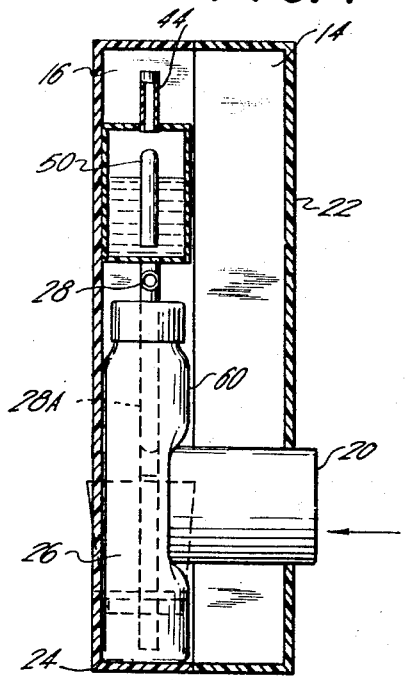
FIGURE 4 is a sectional view taken along 4—4 of FIGURE 3 in the direction of the arrows to the left of the numerals.

With the case in the closed condition (FIG. 1) and the bottle 24 filled with the liquid 26, the actuating member 20, comprising a generally cylindrically shaped solid extending outwardly of cover face 22 and abutting inwardly at the side 60 of bottle 24, is pushed inwardly by the fingers of the user causing the side 60 of the bottle to become displaced springingly inwardly as shown by FIGURE 4 in the direction of the arrow adjacent to member 20. Looking at FIGURE 3 now, this displacement causes the liquid to be forced up the vertical portion 28A of tube 28 in the direction of the arrows into the remainder of tube 28, until the liquid 26 fills the reservoir 30 with the desired measured amount. When the member 20 is released from the pressure of the fingers, it will leave the reservoir 30 in the "cocked" position, as it were, and bottle 24 back in the relaxed position.

Thereafter to fill the glass 40, the member 20 is pushed again, FIGURE 5, the liquid 26 is caused to further fill reservoir 30 until the level of the liquid 26 reaches the level of horizontal portions 62 and 64 at the upper ends of tubes 28 and 32, respectively, said horizontal portions 62 and 64 being at the same height in the reservoir 30, on opposing sides 30A and 30B, respectively, with the result that the liquid commences to flow into glass 40 by means of end 38 of tube 32. As shown by FIGURE 5 the entire reservoir 30 has been caused to entirely fill by leaving the pressure on member 20 for too long a period. This is not serious because when the member 20 is released as in FIGURE 6, reverse suction occurs so that the excess liquid is drawn back into tube 28 and thus back into bottle 24 until the right angle end 28C of said tube 28 which is in said liquid just clears the liquid; thence the reverse suction ceases but the flow of liquid continues into glass 40 until the reservoir 30 is substantially empty whereby the glass is resultingly full. It is of course understood that the size of the reservoir may be varied to give whatever measured amount may be desired, as well as the level of the tubes.

In another embodiment, and a more preferred one, the reservoir 30 need not be "cocked" as shown in FIGURE 3, since the action of pushing in member 20 may be made but a single step. Specifically, what is done is to hold pressure on the actuating member 20 until the condition of FIGURE 6 is achieved, and when the liquid starts to flow into the glass the member 20 is released and the polyethylene bottle springs back to its original condition.

Figure 4A:
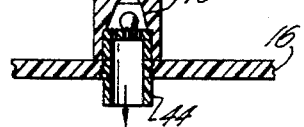
FIGURE 4A is a view in cross-section of a specific embodiment of the invention, as shown cut-away.

If the pressure on member 20 is maintained even after the flow of liquid begins, the excess flowing out of the reservoir can be taken up by the air vent 44, which would immediately signal the user to release the pressure on member 20. This leads to still another embodiment as shown in FIGURE 4A and that is a ball valve 70 is adapted to air vent 44 which valve will rise with the excess liquid in air vent 44, preventing spillage outside of the air vent 44, and when the pressure on member 20 is relieved the valve will fall with the liquid in the direction of the arrows shown in the figure.

In FIGURES 7 and 8 is illustrated still another embodiment of the invention. Rear portion 16 of case 12 is divided into two compartments by a partition 72 which runs parallel to cover face 22 and extends vertically about 40-50% of the height of rear portion 16. In the compartment closest to the front cover 14 is disposed the polyethylene bottle 24 in the manner as described hereinabove. It is similarly connected with reservoir 30, as also previously described. In the rearmost compartment is provided a rubber bulb 74 secured by means of a clamp 76 to rear wall 78 of said rear portion 16. From the top of said bulb 74 leads a tube 80 which traverses upwardly adjacent to the front side 82 of reservoir 30 and finally into the top of reservoir 30 by means of a bore (not shown) but above the level of horizontal members 62 and 64 of tubes 28 and 32, respectively. Another actuating member 84 is provided through the rear wall 78 of rear portion 16 and extending outwardly therefrom and abutting at its inside end with said bulb 74. In the operation of this embodiment the reservoir 30 is "cocked" as before by a simple push on member 20. After the "cocking" action the rubber bulb 74 is squeezed by means of pushing actuating member 84 against it in the direction of the arrow, forcing air contained therein into reservoir 30, which forced air forces liquid up into end 50 of tube 32 thereby starting the siphoning action into glass 40 of the liquid. A housing 90 is provided on the rear wall 78 which is adapted to hold actuating member 84. It comprises a generally rectangular shaped box with a bore 94 centrally located therein adapted to receive member 84.

The tubing connections described above throughout may be rubber or plastic. The reservoir 30 is preferably plastic but it may also be glass. Actuating members 20 and 84 comprising generally cylindrically shaped bodies, preferably solid, are preferably made of vulcanized rubber, rubber or plastic, or the like.

As a novelty item, the actuating member 20 may be painted a bright red and the cover face 22 may be inscribed with the words "PANIC BUTTON" so that the assembly may be sold as one of the so-called "executive" items.

It is to be understood that the case 12 may have to be steadied with the free hand of the user when applying pressure to the actuating members 20 and 84 in order to prevent tipping the case over or to apply added pressure.

The liquid to be dispensed is preferably alcoholic; however, it is also to be understood that the invention is suitable for any liquid.

Having thus described the invention as applied to specific embodiments thereof, it is to be understood that various changes may be made by those skilled in the art without departing from the spirit and scope thereof.

I claim:

1. A dispenser for dispensing measured amounts of liquid comprising in combination a first reservoir means for holding a major proportion of said liquid and second reservoir means flowingly connected thereto for holding a minor proportion of said liquid, said second reservoir means having air venting means and being further connected with uninterrupted flowing means for uninterruptedly delivering said liquid in measured amount, said first and second reservoir means being contained in a housing therefor, actuating means provided for activating said first reservoir means, so that when said actuating means are initiated said liquid will be caused to be displaced into said second reservoir means in minor amount with the result that said flowing means will deliver said measured amount of liquid into receiving means provided outside of said housing.

2. A dispenser for dispensing measured amounts of liquid comprising in combination a first reservoir means for holding a major proportion of said liquid and second reservoir means flowingly connected thereto for holding a minor proportion of said liquid, said second reservoir means having air venting means and being further connected with flowing means for delivering said liquid in measured amount, said first and second reservoir means being contained in a housing therefor, actuating means provided for activating said first reservoir means, so that when said actuating means are initiated said liquid will be caused to be displaced into said second reservoir means in minor amount with the result that said flowing means will deliver said measured amount of liquid into receiving means provided outside of said housing and wherein said first reservoir means comprise a squeezable bottle and said second reservoir means comprise a hollow receptacle, said bottle having a tube connecting it with said receptacle, said tube extending down into said bottle for a major distance at one end, and said tube at its other end being adapted to deliver said liquid into said receptacle so as to act in siphoning association with said flowing means for delivering said liquid in measured amount, said actuating means abutting against said bottle through opening means provided for that purpose, so that when said actuating means are pressurized against a wall of said bottle said receptacle will be caused to be at least partially filled by the bottle wall being displaced inwardly causing said liquid to course upwardly through said tube into said receptacle, said pressure being released thereafter allowing the said wall of said bottle to return to its relaxed state.

3. A dispenser according to claim 2 wherein said actuating means are pressurized and depressurized twice, the first pressurization acting to fill said hollow receptacle with a measured amount and the second pressurization causing said flowing means to deliver said measured amount of liquid to a glass provided therefor.

4. A dispenser according to claim 2 wherein said actuating means are pressurized for a time sufficient to substantially fill said hollow receptacle causing said liquid to be delivered by said flowing means, the depressurization of said actuating member causing the excess of liquid in said receptacle to reverseflow back into said bottle by means of said tube connected to said receptacle.

5. A dispenser according to claim 2 wherein said bottle is polyethylene.

6. A dispenser according to claim 1 wherein said air venting means comprise a hollow tube communicating to the exterior of said housing.

7. A dispenser according to claim 2 wherein said housing is substantially rectangular in shape and is divided into a front section and a rear section, said front and rear sections being hingably secured at one side thereof, said bottle and hollow receptacle being disposed in said rear section, said flowing means comprising a U shaped tube at least partially, with one side of said U being placed into said liquid in said receptacle, in inverted relation, the other side of said U extending downwardly and outwardly of said receptacle terminating with a delivering end disposed outwardly of said housing, said delivering end delivering said liquid into said receiving means comprising a glass.

8. A dispenser according to claim 7 wherein said actuating means comprise a substantially cylindrically shaped solid and are received in a bore provided for the same in the cover face of said front section, the flat end of said cylinder abutting against the wall of said bottle.

9. A dispenser according to claim 1 wherein said air venting means comprise air supplying means located within said housing, said air supplying means being activated by actuating means provided for the purpose.

10. A dispenser according to claim 9 wherein said air supplying means comprise a squeezable bulb containing air having a tube extending into the interior of said hollow receptacle and the activation thereof by said actuating means causing air to force liquid into said flowing means for delivering said liquid.

11. A dispenser according to claim 6 wherein said air venting means are provided with a ball valve, so that an excess of said liquid in said second reservoir means is prevented from ejecting from said hollow tube.

12. A dispenser according to claim 7 wherein said tubing from bottle to receptacle and from receptacle to delivery to receiving means is plastic, and said receptacle is plastic.

13. A dispenser according to claim 2 wherein said hollow receptacle is substantially rectangular in shape.

References Cited

UNITED STATES PATENTS 2,744,663    5/1956    White _____ 222—211 X
3,010,614    11/1961    Udy _____ 222—204

STANLEY H. TOLLBERG, *Primary Examiner.*

U.S. Cl. X.R.

222—204